(12) United States Patent
Morales et al.

(10) Patent No.: US 7,886,220 B2
(45) Date of Patent: Feb. 8, 2011

(54) SMART LAYER RENDERING

(75) Inventors: Javler A. Morales, Rochester, NY (US); Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1366 days.

(21) Appl. No.: 11/356,655

(22) Filed: Feb. 16, 2006

(65) Prior Publication Data

US 2007/0192680 A1 Aug. 16, 2007

(51) Int. Cl.
*G06F 17/00* (2006.01)
(52) U.S. Cl. ............... 715/229; 715/209; 715/273
(58) Field of Classification Search ........... 715/229, 715/273, 209, 243, 255
See application file for complete search history.

(56) References Cited

U.S. PATENT DOCUMENTS

| | | | | |
|---|---|---|---|---|
| 5,357,631 A * | 10/1994 | Howell et al. | .......... | 1/1 |
| 5,813,020 A * | 9/1998 | Hohensee et al. | .......... | 715/234 |
| 5,870,764 A * | 2/1999 | Lo et al. | .......... | 1/1 |
| 6,154,756 A * | 11/2000 | Hearn et al. | .......... | 715/236 |
| 6,276,724 B1 * | 8/2001 | Zorn | .......... | 283/56 |
| 7,047,490 B1 * | 5/2006 | Markovic et al. | .......... | 715/234 |
| 7,218,405 B1 * | 5/2007 | Aschenbrenner et al. | ... | 358/1.15 |
| 7,322,006 B1 * | 1/2008 | Ohashi | .......... | 715/229 |
| 7,426,057 B2 * | 9/2008 | Mori et al. | .......... | 358/1.18 |
| 7,496,230 B2 * | 2/2009 | Chen et al. | .......... | 382/182 |
| 7,571,383 B2 * | 8/2009 | Nomiyama et al. | .......... | 715/260 |
| 2003/0101414 A1 * | 5/2003 | Liu et al. | .......... | 715/513 |
| 2003/0177194 A1 * | 9/2003 | Crocker et al. | .......... | 709/206 |
| 2004/0051732 A1 * | 3/2004 | White et al. | .......... | 345/736 |
| 2005/0030588 A1 * | 2/2005 | Reese et al. | .......... | 358/3.28 |
| 2005/0081144 A1 * | 4/2005 | Hailey et al. | .......... | 715/513 |
| 2005/0125728 A1 * | 6/2005 | Peiro et al. | .......... | 715/523 |
| 2005/0193341 A1 * | 9/2005 | Hayward et al. | .......... | 715/716 |
| 2005/0262430 A1 * | 11/2005 | Croft | .......... | 715/507 |
| 2006/0224952 A1 * | 10/2006 | Lin | .......... | 715/517 |
| 2006/0288269 A1 * | 12/2006 | Oppenlander et al. | .......... | 715/505 |

* cited by examiner

*Primary Examiner*—Laurie Ries
(74) *Attorney, Agent, or Firm*—Kermit D. Lopez; Luis M. Ortiz; Ortiz & Lopez, PLLC

(57) ABSTRACT

A document can contain multiple print layers. Different layers can be combined to produce different document versions. In this manner, a document can have an English version and a Spanish version sharing graphics layers but having different text layers. A document version specification can be used for producing a certain version of the document. Some documents, however, have many layers and desired layer combinations. A set of document version specifications can be used to ensure that all the desired versions are produced without any version being forgotten or any undesired version being produced. Dividing the layers amongst a set of layer groups helps in creating the specifications. A set of rules can be submitted to a rule module to automatically generate the desired specifications.

16 Claims, 7 Drawing Sheets

SMART LAYER RENDERING

TECHNICAL FIELD

Embodiments relate to creating, editing, displaying, printing and proofing documents. Embodiments also relate to creating printable layers that can be combined to form documents where different layer combinations correspond to different document versions.

BACKGROUND

A document is, roughly, a combination of textual and graphical elements that are rendered together. Two ways of rendering a document are printing it or displaying it on a display device such as a computer monitor. In professional settings, documents often have versions. Different versions of a document can arise from editing or correcting it over time. Different versions of a document can also arise by changing the content to focus on different audiences. For example, one version of a document can be intended for an English speaking audience while a different version is intended for a Spanish speaking audience. Versions intended for different audiences are concurrently valid while versions arising from editing over time are sequentially valid.

Concurrently valid documents versions are difficult to track and maintain. Originally, every version was treated individually. Changing one version often resulted in laboriously making a related change to every other version. For example, if every version contained the same watermark, then changing the watermark entailed changing it for every version.

Layering is a technique that eases the process of making similar changes to many concurrent document versions. Returning to the example above, the different versions can all share a common watermark layer while each version has a unique text layer. The English version has an English text layer while the Spanish version has a Spanish text layer. A version of the document can be produced by rendering the common layer and a unique text layer. Some documents have many common layers and unique layers.

FIG. 5, labeled as "prior art", illustrates rendering a document 501 with multiple concurrent versions. The document 501 has four layers. The first layer is for languages 503 such as an English layer 403, Spanish layer 404, and a Mandarin layer 405. The second layer is for products 504 such as a football layer 407, soccer layer 408, and a volleyball layer 409. The third layer is for pictures 506 such as a beach layer 411, mountains layer 412, and a crowd layer 413. The watermark layer 425 is a common layer. A document specification 416 calls for English, soccer, and crowd. Layering 502 is a task, often performed manually, that generates information that a rendering device 422 uses to produce an English, soccer, crowd document. The document also contains the common watermark layer 425.

To generate a different version of the document, a person must create another document specification and layer it before the rendering device can produce the document. As such, minor changes to a single layer can cause changes in a number of document versions. The new versions must be checked for errors and, hopefully produced in quantity. Specifying and printing out all the required new versions can be tedious, time consuming, and error prone. Systems and methods to address the shortcomings of current solutions are needed.

BRIEF SUMMARY

Aspects of the embodiments address limitations and flaws in the prior art by automatically creating concurrent versions for proofing and production.

It is therefore an aspect of the embodiments to create a document having at least two layer groups. Each layer group contains at least one layer and each layer specifies the rendering of text or graphics. One layer group can be a language layer group. A language layer group has language layers, such as English, Spanish, Mandarin, or other languages. A picture layer group can have graphics, such as pictures of a beach, mountains, or a crowd. A product layer group can have layers specific to different products such as products related to football, soccer, or volleyball.

It is another aspect of the embodiments to obtain at least two document version specifications. A document version specification specifies a document version by selecting at least one layer from at least one of the layer groups but no more than one layer from any one of the layer groups.

It is yet another aspect of the embodiments to layer the document version specifications and to render the document versions. A document version can be rendered by printing it or by displaying it on a display device such as a computer monitor.

It is a further aspect of the embodiments to alter at least one layer, layer the document version specifications, and render new document versions. The document versions are new because of the changed layer. It is entirely possible that only one of the new versions is different from the older version because the layer change is specific to that one document version.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE INVENTION

The particular values and configurations discussed in these non-limiting examples can be varied and are cited merely to illustrate embodiments and are not intended to limit the scope of the invention.

Figure 1:
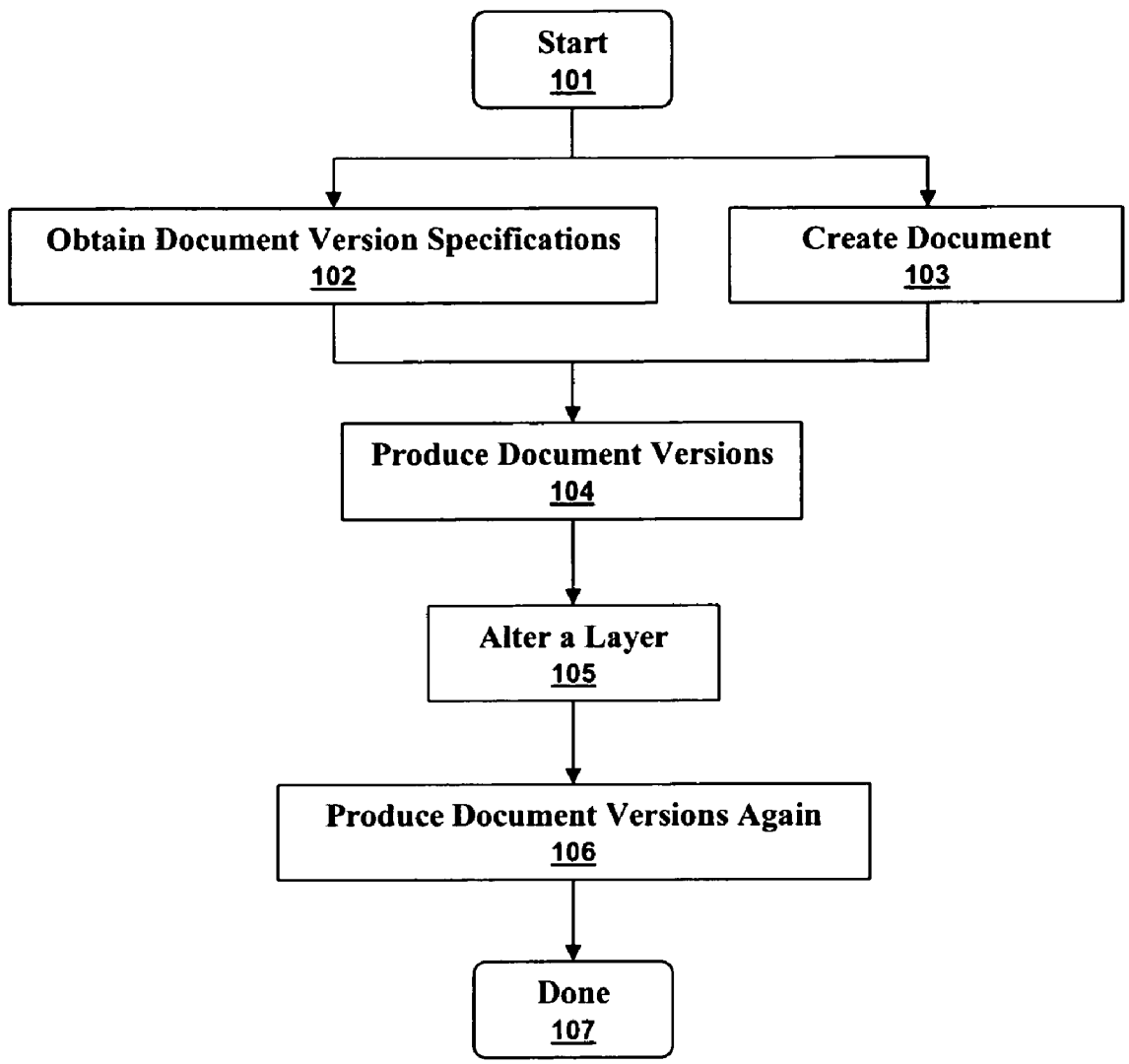
FIG. 1 illustrates a high level flow diagram of using document version specifications to produce document versions in accordance with aspects of the embodiments.

FIG. 1 illustrates a high level flow diagram of using document version specifications to produce document versions in accordance with aspects of the embodiments. After the start 101, document version specifications are obtained 102 and a document is created 103. Document versions are produced 104 by layering the document version specifications and rendering the document versions. Next, a layer is altered 105 and then new document versions are produced 106 before the process is done 107. The document version specifications are shown being obtained once and then used without alteration. Further more, the document version specifications can be obtained independently from creating the document. For example, a person can choose to always produce documents having one common layer and two layer groups. Furthermore, that person can choose to specify only certain combinations of layers from the two layer groups. Once those specifications are created, the person can use them for years and for many different documents.

Figure 2:
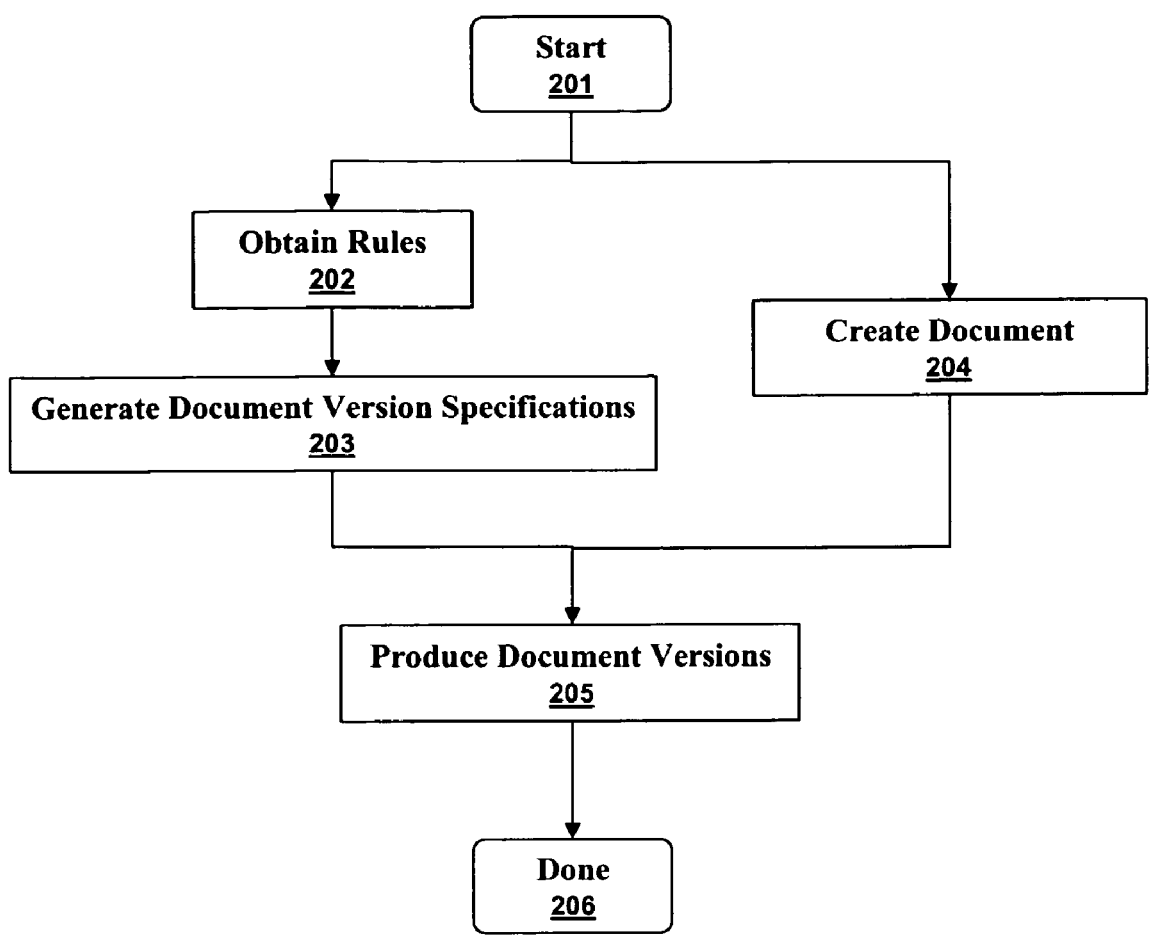
FIG. 2 illustrates a high level flow diagram using rules to produce document versions in accordance with aspects of certain embodiments.

FIG. 2 illustrates a high level flow diagram using rules to produce document versions in accordance with aspects of certain embodiments. After the start 201 a document is created, and rules are obtained 202. Document version specifications are generated 203 from the rules. The rules can be any sort of direction than can be interpreted by a rule module. For example, one rule can be to include every common layer in every document version specification. Another rule can be to generate every possible combination of layers. For example, a document having two layer groups with two layers in the first group and three layers in the second group has six possible combinations. Another rule can be to exclude certain layer combinations. For example, it would rarely be appropriate to print beef recipes in Hindi. Finally, the document versions are produced 205 and the process is done 206.

Figure 3:
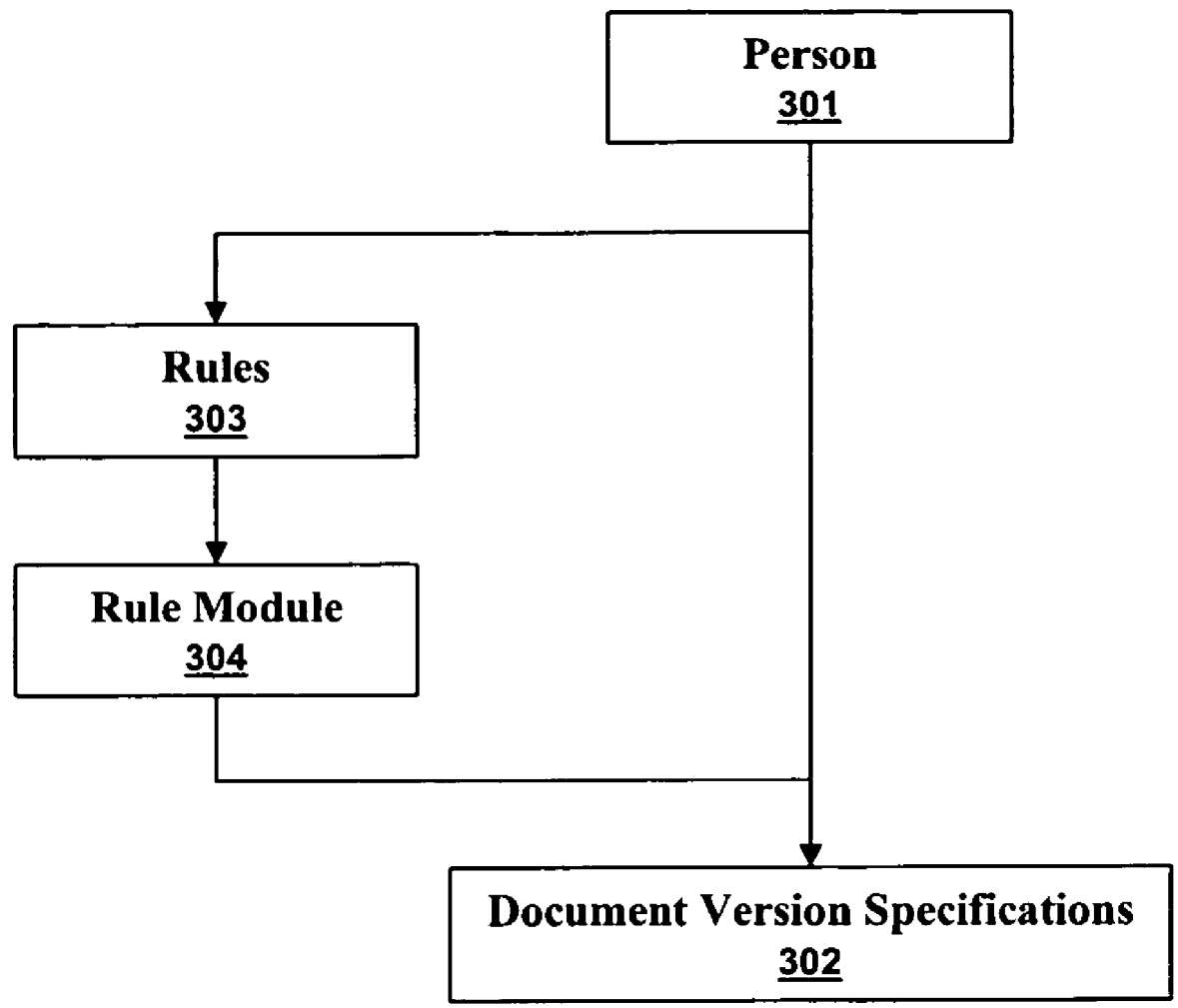
FIG. 3 illustrates a high level flow diagram of a person producing document version specifications in accordance with aspects of the embodiments.

FIG. 3 illustrates a high level flow diagram of a person 301 producing document version specifications 302 in accordance with aspects of the embodiments. The person 301 can directly create the document version specifications 302 and can also create rules 303. If the person 301 creates rules 303, then the rules 303 are processed by a rule module 304 to obtain the document version specifications.

Figure 4:
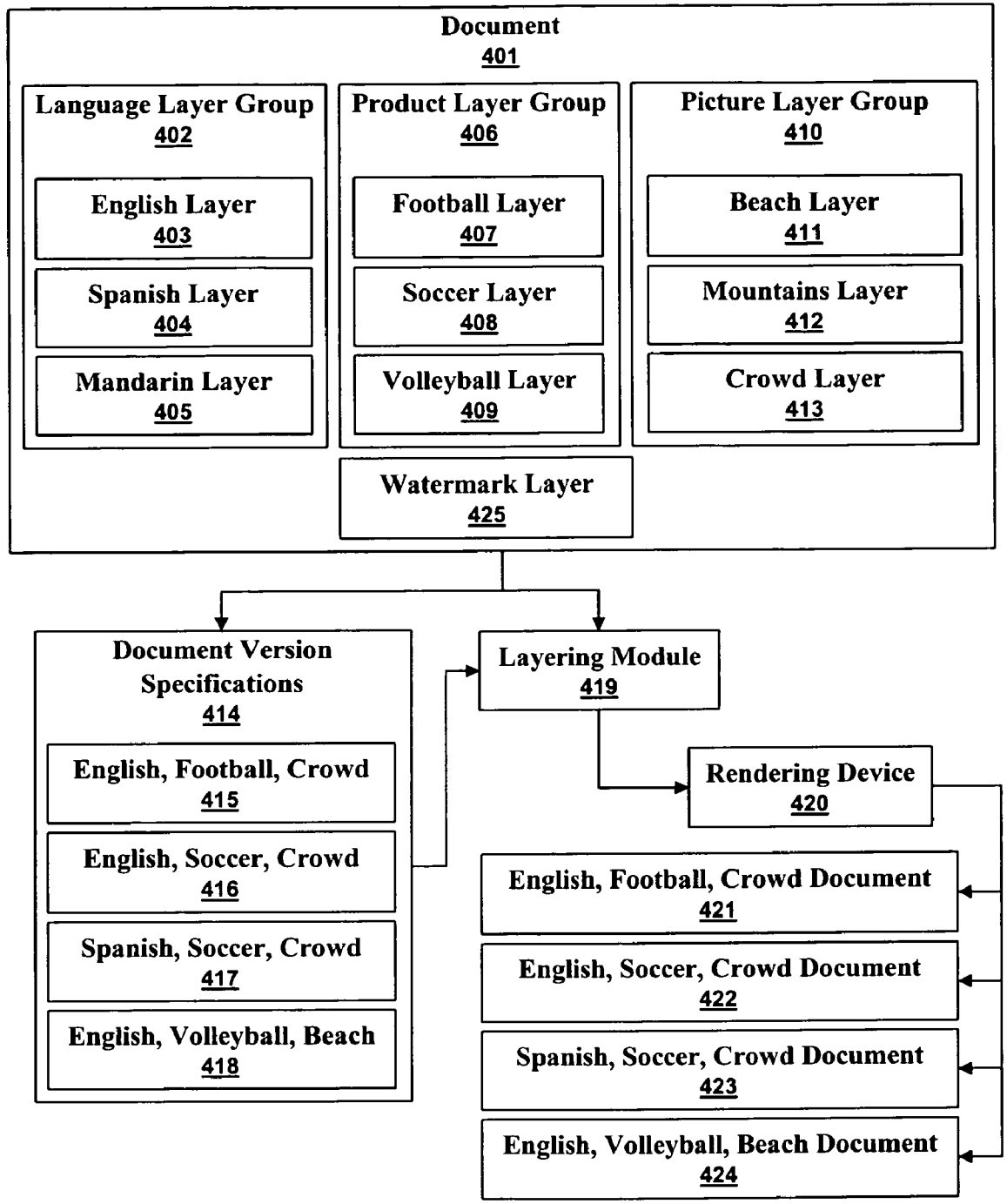
FIG. 4 illustrates rendering multiple concurrent versions of a document in accordance with aspects of the embodiments.
Figure 5:
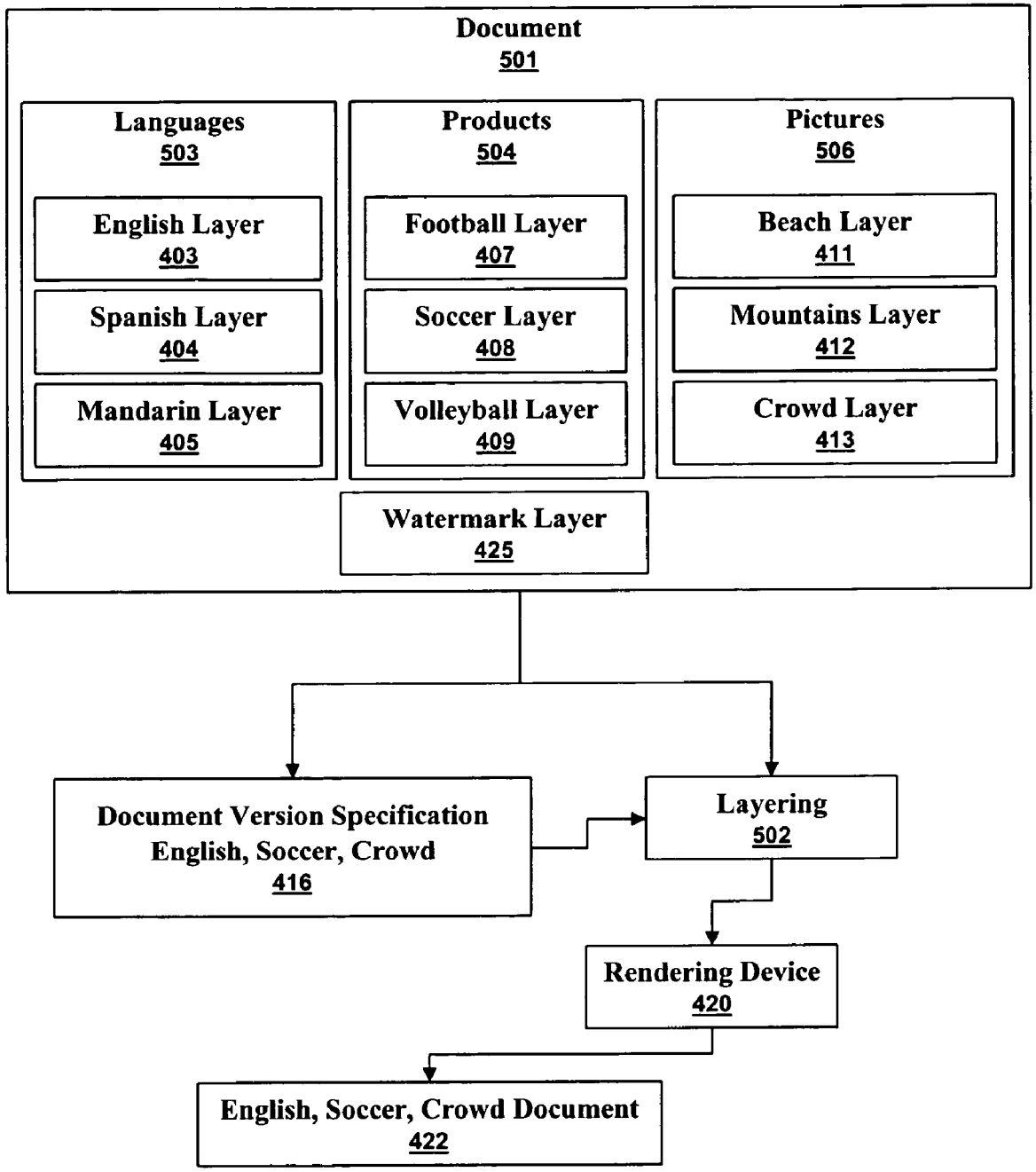
FIG. 5, labeled as "prior art", illustrates rendering a document with multiple concurrent versions.

FIG. 4 illustrates rendering multiple concurrent versions of a document 401 in accordance with aspects of the embodiments. The document 401 has three layer groups. The language layer group 402 includes an English layer 403, a Spanish layer 404, and a Mandarin layer 405. The product layer group 406 includes a football layer 407, a soccer layer 408, and a volleyball layer 409. The picture layer group 410 includes a beach layer 411, a mountains layer 412, and a crowd layer 413. The watermark layer 425 is in a common layer and appears in every document version.

The document specifications 414 are English-football-crowd 415, English-soccer-crowd 416, Spanish-soccer-crowd 417, and English-volleyball-beach 418. The layering module 419 accepts the document version specifications 414 and layers them so that the document version can be rendered by a rendering device 420. The rendering device produces a English-football-crowd document 421, English-soccer-crowd document 422, Spanish-soccer-crowd document 423, and a English-volleyball-beach document 424.

Figure 6:
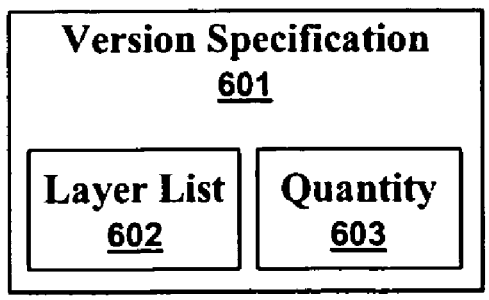
FIG. 6 illustrates a version specification having a quantity parameter and a layer list in accordance with aspects of some embodiments.

FIG. 6 illustrates a version specification 601 having a quantity parameter 603 and a layer list 602 in accordance with aspects of some embodiments. A version specification 601 can have a quantity 603 that can specify the number of copies of each document version to produce. The layer list specifies which layers are used in rendering the document version.

Figure 7:
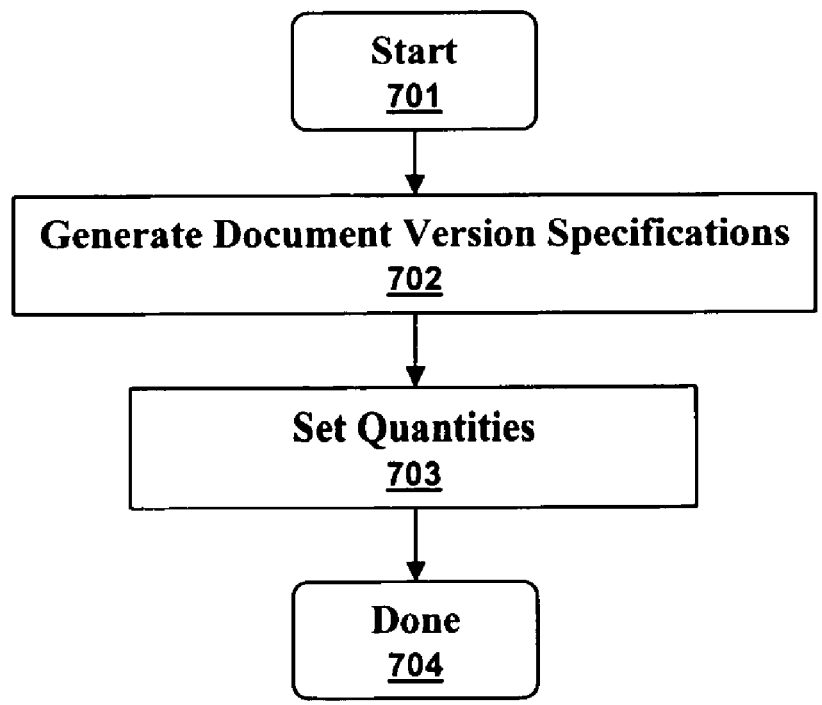
FIG. 7 illustrates a high level flow diagram of specifying document version quantities in accordance with aspects of some embodiments.

FIG. 7 illustrates a high level flow diagram of specifying document version quantities in accordance with aspects of some embodiments. After the start 701 the document version specifications are generated 702. Next, the quantities of each version are set 703 and the process is done 704. The quantities can be set by a person entering data, can be automatically set based on policies or rules, can be copied from existing specifications or templates, or can be set in another manner.

Figure 8:
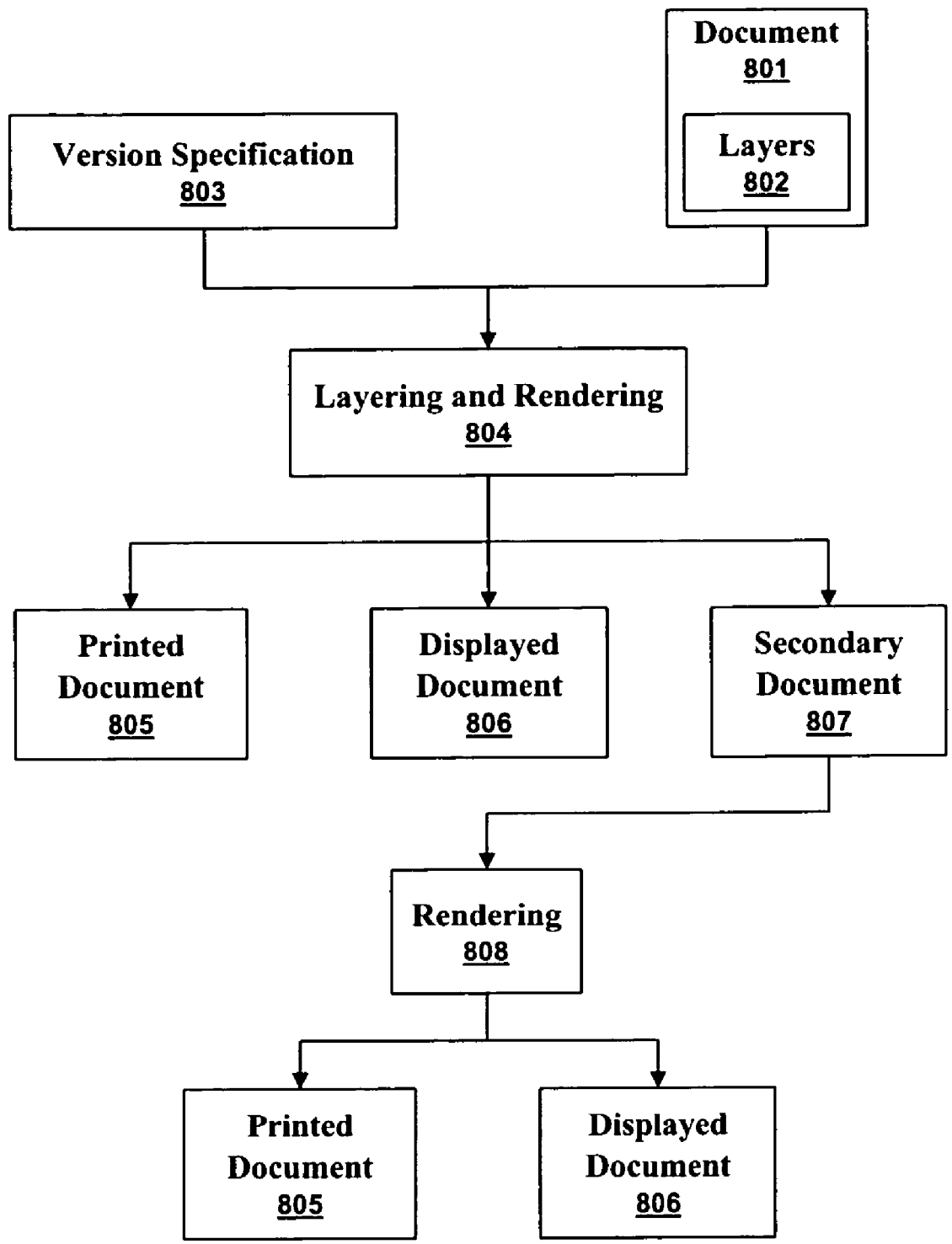
FIG. 8 illustrates some of the formats into which a document can be rendered in accordance with aspects of the embodiments.

FIG. 8 illustrates some of the formats into which a document 801 can be rendered in accordance with aspects of the embodiments. A document 801 containing layers 802 is subjected to layering and rendering 804 based on a version specification 803. The rendered document can be a printed document 805, a displayed document 806 or a secondary document 807. A displayed document 806 is a document appearing on a computer display or similar device. A secondary document 807 is a document based on the original 801 document. Subjecting the secondary document 807 to rendering 808 can produce the printed document 805 or displayed document 806. For example, the secondary document contains only those layers specified in the version specification 803. In another example the secondary document contains a single layer that can be rendered to produce the displayed document 806 or printed document 805. Yet another example is that the secondary document contains no layers, but can be directly rendered to produce the displayed document 806 or printed document 805.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules, hardware modules, or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
   creating a document comprising a plurality of layer groups wherein each one of the layer groups comprises at least one layer and every layer specifies the printing of text, graphics or text and graphics, wherein one of the plurality of layer groups is a language layer group comprising at least one language layer;

obtaining a plurality of document version specifications specifying a plurality of document versions wherein each one of the document version specifications selects at least one language layer for inclusion in one of the document versions;

layering the document version specifications and rendering the document versions;

altering at least one layer; and layering the document specifications and rendering a plurality of new document versions.

2. The method of claim 1 further comprising a secondary document comprising only those layers specified by one of the document version specifications.

3. The method of claim 1 wherein a display device renders the plurality of document versions.

4. The method of claim 1 wherein one of the plurality of layer groups is a picture layer group comprising at least one picture layer.

5. The method of claim 1 wherein one of the plurality of layer groups is a product layer group comprising at least one product layer.

6. The method of claim 1 wherein a printer renders the plurality of document versions, wherein one of the plurality of layer groups is a background layer group comprising at least one background layer, and wherein one of the plurality of layer groups is a language layer group comprising at least one language layer.

7. A method comprising:

obtaining a document comprising a plurality of layer groups wherein each one of the layer groups comprises at least one layer and every layer specifies the printing of text, graphics, or a combination of text and graphics, wherein one of the plurality of layer groups is a language layer group comprising at least one language layer;

obtaining at least one rule directing the generation of at least one document version specification;

generating the at least one document version specifications wherein each one of the at least one document version specifications selects at least one language layer;

layering the two or more document version specifications; and rendering two or more document versions.

8. The method of claim 7 wherein the two or more document versions are rendered into two or more secondary documents.

9. The method of claim 7 wherein a display device renders the two or more document versions.

10. The method of claim 7 wherein one of the plurality of layer groups is a picture layer group comprising at least one picture layer.

11. The method of claim 7 wherein one of the plurality of layer groups is a product layer group comprising at least one product layer.

12. The method of claim 7 wherein a printer renders the two or more document versions, wherein one of the plurality of layer groups is a background layer group comprising at least one background layer, and wherein one of the plurality of layer groups is a language layer group comprising at least one language layer.

13. The method of claim 7 wherein a display device renders the two or more document versions, wherein one of the plurality of layer groups is a background layer group comprising at least one background layer, and wherein one of the plurality of layer groups is a language layer group comprising at least one language layer.

14. A computer-usable recordable medium for producing document versions, said computer-usable recordable medium embodying computer program code, said computer program code comprising:

an authoring module used for creating documents wherein a document comprises a plurality of layer groups wherein each one of the layer groups comprises at least one layer and every layer specifies the printing of text, graphics or text and graphics, wherein one of the plurality of layer groups is a language layer group comprising at least one language layer;

at least one rule;

a rule module wherein the at least one rule directs the rule module to generate at least one document version specification, wherein each document version specification selects at least one language layer for inclusion in one of at least one document version;

rendering the at least one document version.

15. The recordable medium of claim 14 further comprising two or more secondary documents that are produced by a rendering device.

16. The recordable medium of claim 14 wherein the rendering device is a display device.

* * * * *